Jan. 19, 1954  M. F. HILL ET AL  2,666,336
INTERNAL GEAR TEETH
Filed June 10, 1950  4 Sheets-Sheet 1
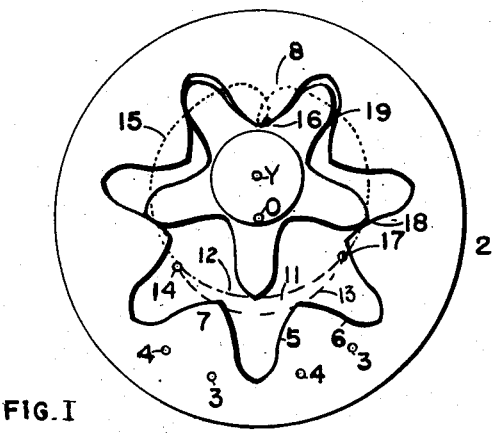
FIG. I
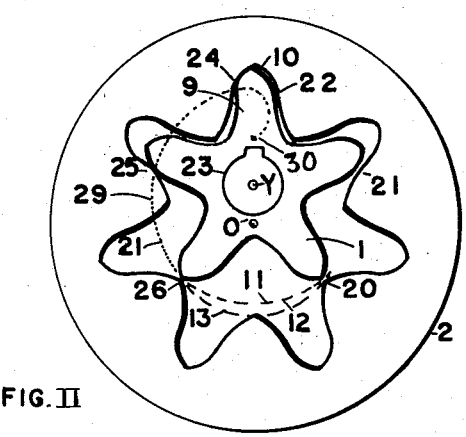
FIG. II
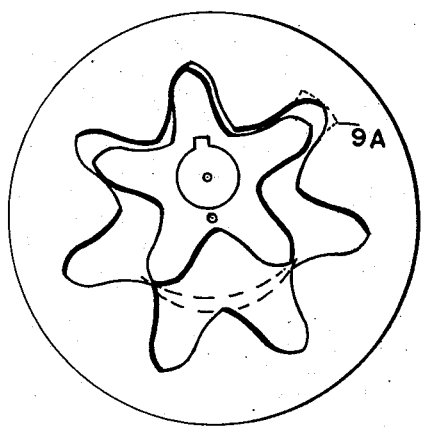
FIG. III
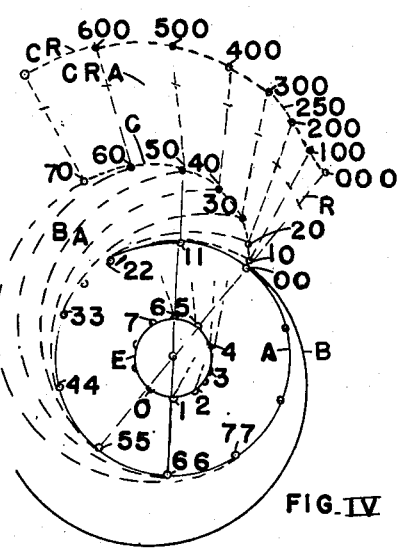
FIG. IV
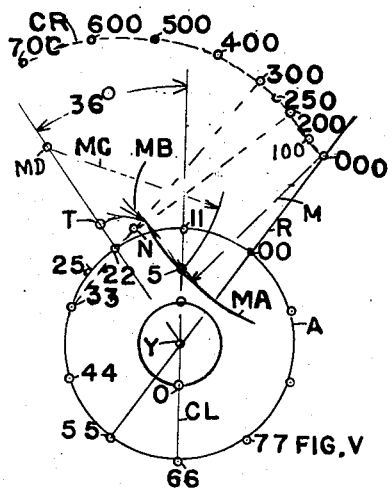
FIG. V
*INVENTORS*
MYRON FRANCIS HILL
FRANCIS A. HILL 2ND
Myron Francis Hill
ATT'Y Jan. 19, 1954 M. F. HILL ET AL 2,666,336
INTERNAL GEAR TEETH
Filed June 10, 1950 4 Sheets-Sheet 2
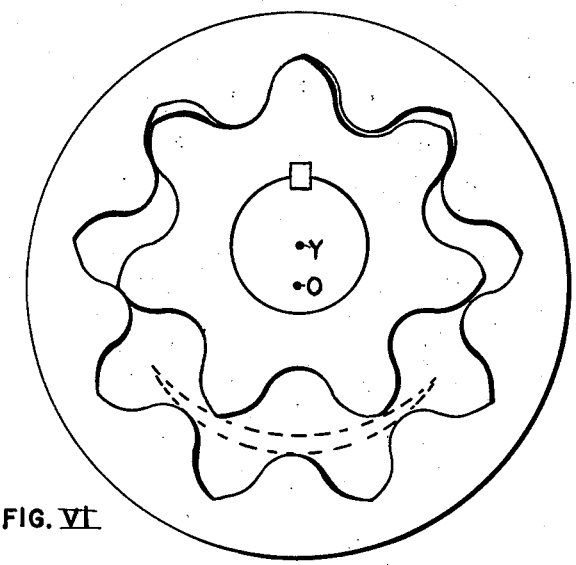
FIG. VI
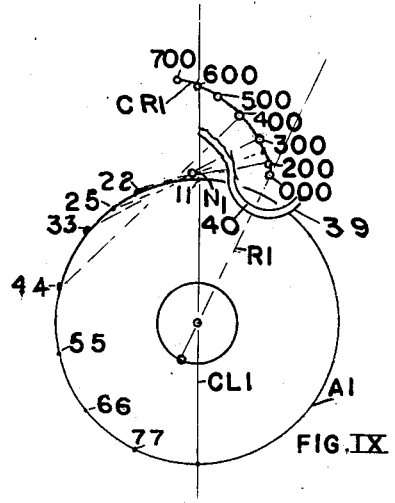
FIG. IX
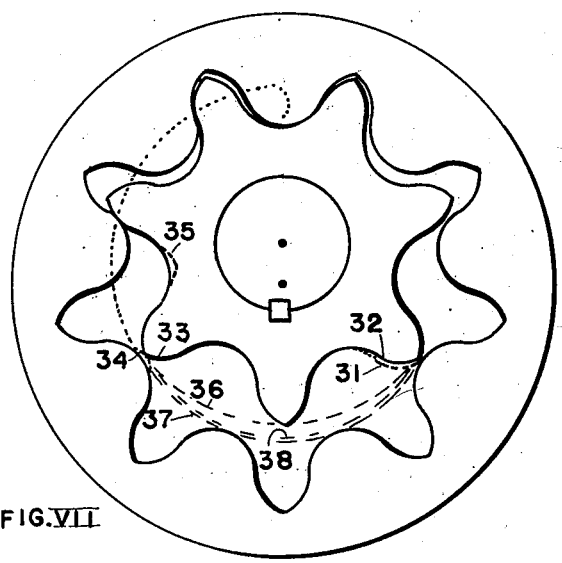
FIG. VII
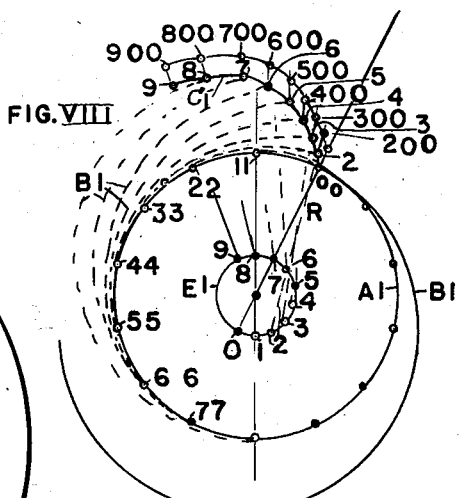
FIG. VIII
*INVENTORS*
MYRON FRANCIS HILL
FRANCIS A. HILL, 2ND
ATT'Y Jan. 19, 1954   M. F. HILL ET AL   2,666,336
INTERNAL GEAR TEETH
Filed June 10, 1950   4 Sheets-Sheet 3
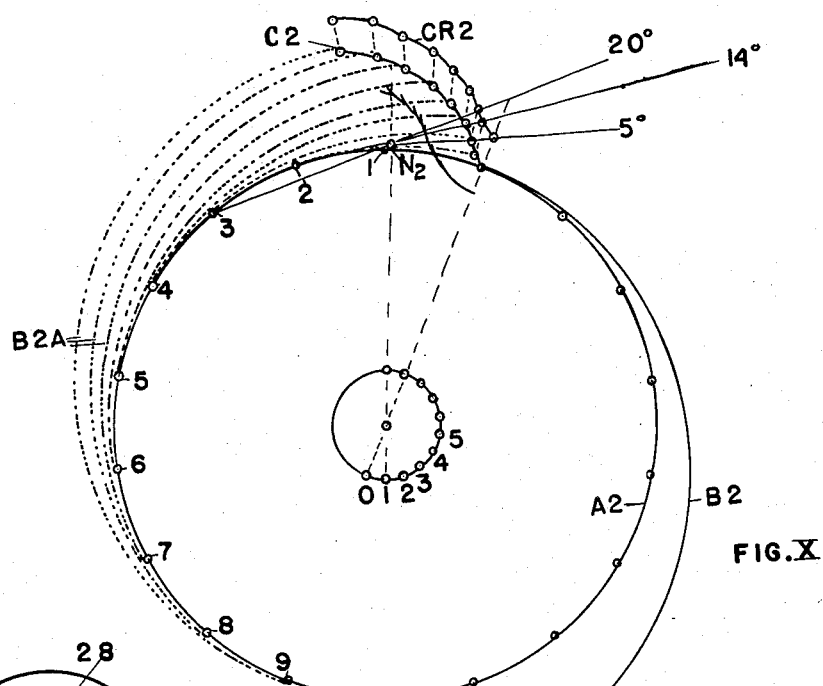
FIG. X
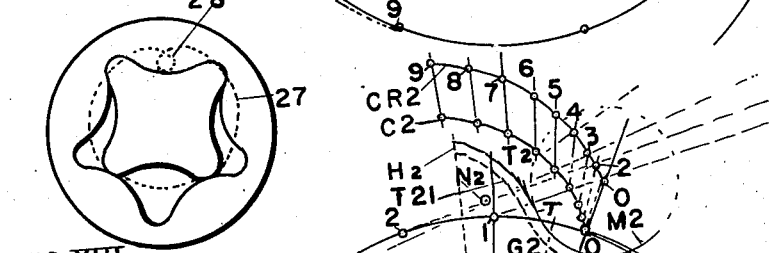
FIG. XIII
PRIOR ART
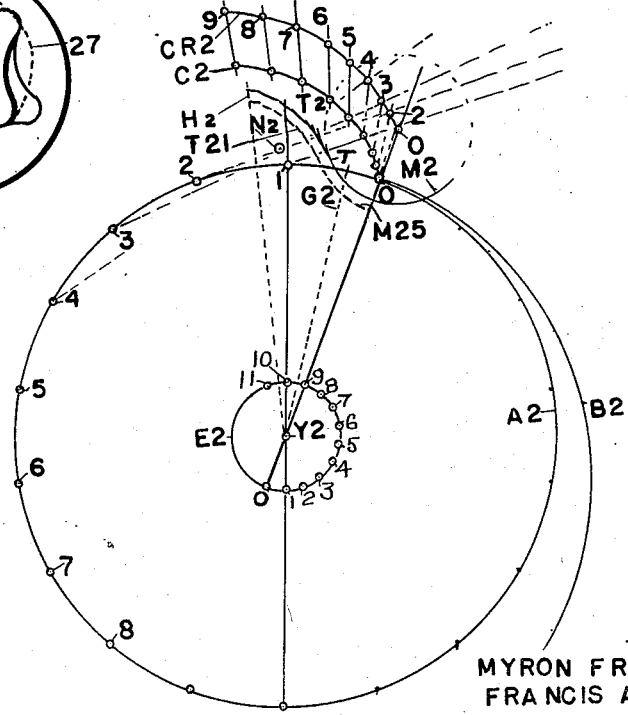
FIG. XI
INVENTORS
MYRON FRANCIS HILL
FRANCIS A HILL 2ND
*Myron Francis Hill*
ATT'Y

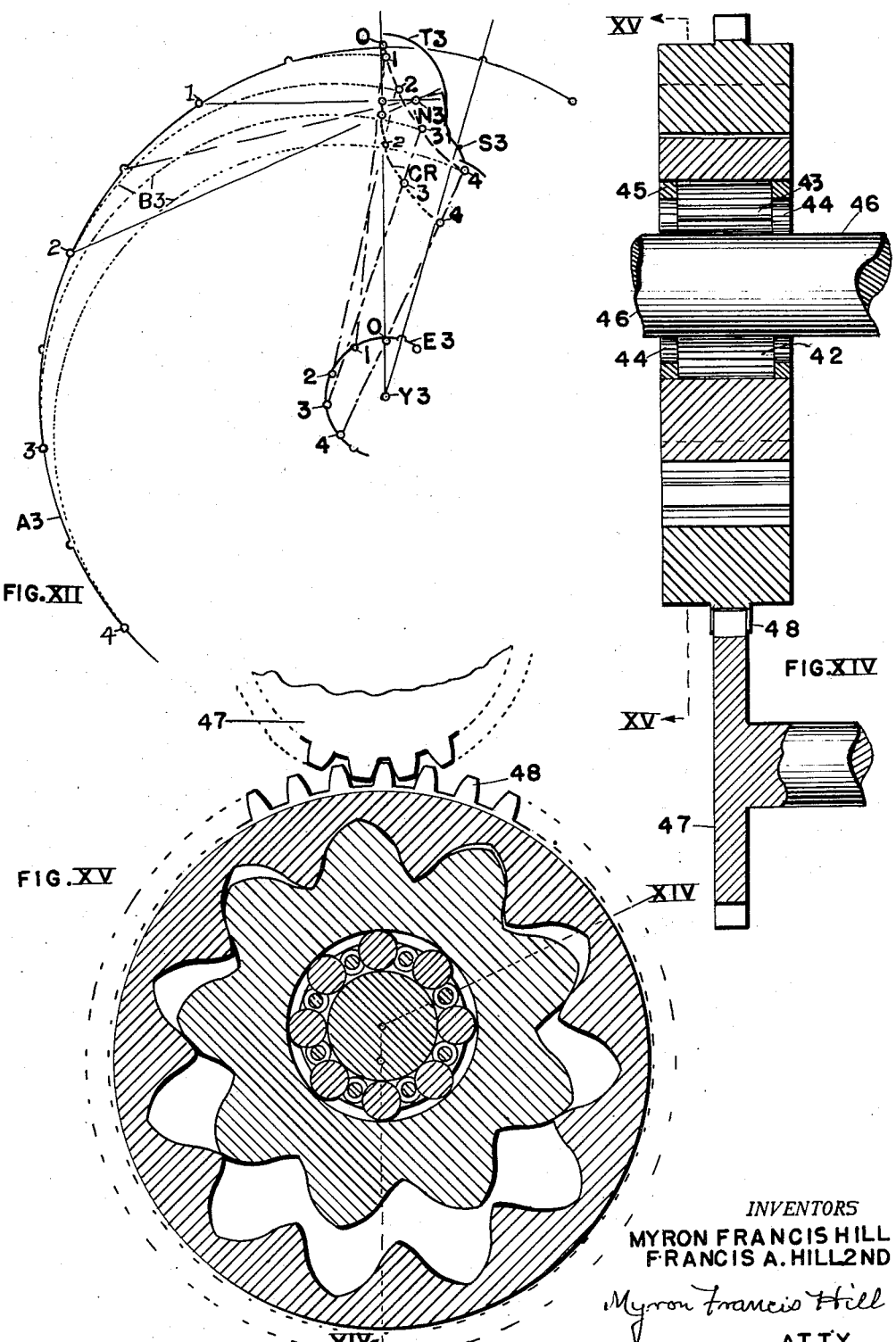

Patented Jan. 19, 1954

2,666,336

UNITED STATES PATENT OFFICE 2,666,336

INTERNAL GEAR TEETH

Myron Francis Hill and Francis A. Hill 2nd,
Westport, Conn.

Application June 10, 1950, Serial No. 167,471

15 Claims. (Cl. 74—462)

This application is a continuation in part of our allowed application Serial Number 561,498, filed November 4, 1944; and of pending applications Numbers 659,098, filed April 2, 1946; and 155,176, filed April 11, 1950; and is distinguished from the inventions in those cases by limitation to internal change speed gears. Other internal gears have one or two teeth engaging at full mesh, but lacking the "circroidal" addition explained below, are not reinforced by other tooth contacts to enable them to withstand sudden shocks tending to break or "strip" the teeth. It also includes features not disclosed in those applications.

Our gears have been impossible heretofore since their tooth contours are based on new principles of geometry which have escaped the attention of designers of rotor and gear teeth.

A series of patents to M. F. Hill, particularly Reissue Patent Number 21,316, described rotors, referred to hereinafter as Gerotors (their trade name), one within and eccentric to the other and having a tooth ratio of numbers differing by one. The teeth of one maintain continuous tight engagements with the teeth of the other, during rotation. As Gerotors rotate, each tooth of one rotor enters the tooth spaces of the other. Teeth of one rotor slide or roll over all the teeth of the other rotor. The rotors are made with such precision that contacts between them persist thruout rotation.

Gerotors were of course in sets, with ratios of teeth of 4 to 5, 6 to 7, 8 to 9, and 10 to 11.

Our present invention, under the trade-mark name Rotoids, includes sets having tooth ratios of 5 to 7, 7 to 9, 9 to 11, etc. Such gears depend, for continuous tooth engagements, upon a difference of one and maintained in engagement by a driving relation between them. But, having a difference of two in numbers of teeth their actual basic ratios are 2½ to 3½; 3½ to 4½; 4½ to 5½; and 5½ to 6½, which have the necessary difference of one.

The teeth of a gear in the internal gear art are disposed around a pitch circle, the radius of which is arrived at in substance by multiplying the eccentricity distance between their centers by the numbers of the teeth of the gear. In our Patent 2,386,896, the rotors have even numbers of teeth, such as 6 to 8, 8 to 10, 10 to 12, etc. The radii of their pitch or ratio circles were arrived at by multiplying the distance between their two axes, their "eccentricity" by half the numbers of teeth respectively. The radii of the two ratio circles for 6 to 8 teeth for example, are the products of the eccentricity multiplied by 3 and by 4; that is, by one half the numbers of teeth; or to put it another way, by the numbers of teeth divided by the difference in their numbers of teeth. The radii of the two ratio circles of 9 to 12 teeth, as another illustration, were found by multiplying their eccentricity by one third of 9 and one third of 12. These factors were disclosed in the general description and in the drawings.

In our present invention the same rule applies to our ratio circles so that the radii of ratio circles for five to seven teeth are found by multiplying the eccentricity by one half of five and one half of seven, or 2½ and 3½, which is a basic fractional ratio having the difference of one, an essential factor of continuous travelling tooth contacts between the rotors. For a ratio differing by three, 5 to 8 for example, the radii are the products of the eccentricity times one third of 5 and one third of 8, or 1⅔ and 2⅔, which also is the basic fractional ratio differing by one, essential for continuous travelling tooth contacts, all described and illustrated later in the drawings and specifications.

These ratios are not variations in degree from each other or from even number ratios such as 6 to 8, 8 to 10, 10 to 12 and so on. Ratios of even numbers of teeth cannot be generated at a single setting but require that half the teeth be generated first, and then the blanks indexed to generate the other half of the teeth between. This nearly doubles the labor cost. Manufacture requires tolerances, often of two or three thousandths of an inch. Such an error in indexing would result in noisy gears. Even a small fraction of this tolerance would result in useless gears for high torque loads. It was the addition or subtraction of one tooth from the even ratios that made possible the generation of all the teeth at one setting. Such uneven numbered ratios are therefore different from the even ratios by more than mere degree. In present commercial sizes 5 X 7 teeth (2½ to 3½ ratio) haven't enough space in the pinion for a shaft capable of operating under high tooth loads.

The 7 X 9 teeth (3½ to 4½ ratio), same eccentricity, allow for an adequate shaft but not for an adequate heavy duty roller bearing inside of the pinion, needed for some uses. But 9 X 11 teeth (4½ to 5½ ratio) same eccentricity, do allow for it.

Further, no ratio under 5½ to 6½ (11 to 13 teeth), same eccentricity, provides for telescoping of bulkheads as in M. F. Hill et al. Patent Number 2,484,789. This basic fractional ratio differing by one makes smaller gears possible. For instance, in an 8 by 9 toothed pair of Gerotors with an eccentric distance of $\tfrac{3}{16}''$ between the center of one gear and that of the other the radius of the 8 tooth pinion ratio circle is $8 \times \tfrac{3}{16} = \tfrac{24}{16}$ inches. The radius of the 9 tooth outer gear is $9 \times \tfrac{3}{16} = \tfrac{27}{16}$ inches. In a pair of Rotoids having the same $\tfrac{3}{16}''$ eccentricity and the same number of teeth in the outer gear, the outer gear ratio circle radius is $4\tfrac{1}{2} \times \tfrac{3}{16} = \tfrac{13.5}{16}$ inch while the 7 tooth pinion ratio circle radius is $3\tfrac{1}{2} \times \tfrac{3}{16} = \tfrac{10.5}{16}$ inch. Thus we see that the Rotoid gears are approximately half the size of the Gerotor rotors. Hence it appears that no difference merely of degree, exists between gears having such numbers of teeth.

As to gears of the same eccentricity, having the difference of one, a 4 X 5, or 5 X 6 ratio is not so limited as to shaft size because of shallower tooth spaces. They have poorer pressure angles and lack the displacement of the 2½ to 3½ ratio. Similar differences occur in ratios of larger numbers.

High pressure is limited by the thrusting of the teeth against each other on the low pressure side where frictional rub between the teeth, greatest toward open mesh, creates heat, gumming of lubricating oil and binding.

Rotoids have no tooth contacts across open mesh or on the low pressure side, so that pressure cannot cause their teeth to rub, create heat and bind. The only mechanical pressure is that of one driving the other across full mesh with a rolling action. The open crescent range at open mesh, assisted by back lash, is the factor that prevents the teeth from rubbing on each other. It makes possible steady speeds at tooth pressures ranging into thousands of pounds.

In our Patent 2,386,896 the off sides of adjoining teeth of the outer gear are limited to a common center. Rotoids have no such limitation.

As Rotoids rotate at ratio speeds, one with relation to the other, that is, at speeds inversely proportional to their numbers of teeth, our new contours make similar continuous wiping and rolling contacts with each other.

Departure from the Gerotor method of designing gear contours makes possible the hunting relation between all the teeth of the gears, and improved pressure angles in the driving range between the teeth at full mesh.

The crescent range also prevents the pinion from riding on the teeth of the outer gear from one end of the crescent to the other. This crescent range is at open mesh between two overlapping circles, one along the tips of the teeth of one gear and the other along the tips of the teeth of the other gear.

Back lash was old, but combined with the continuous contacts, it prevents the teeth of the pinion from riding on the teeth of the outer gear from one end of the crescent range to the driving range at full mesh, while leaving the continuous contacts between the other end of the crescent range and full mesh unaffected. A difference of two or more teeth between gears, old in themselves, created unexpected results with continuous contact gears, causing the rule of continuous contact to be modified, first to include multiples of the ratio having a difference of one; and then changed to include the hunting relation.

It also permitted gear teeth to be built loose, with the contacts brought into action by driving. Thus loosely assembled, gears may lap themselves to a perfect fit in service without binding.

These step by step developments, each valuable in itself, produce new characteristics in continuous contact internal gears.

The first difference of two teeth appeared when, inspecting Fig. IX of the reissue patent to M. F. Hill, No. 21,316, the tooth spaces of the pinion appeared wide enough to hold another tooth, and the outer teeth wide enough for another tooth space. This doubled the number of teeth and they acquired a difference of two which provided the much needed crescent space to eliminate the riding of one gear on the teeth of the other at open mesh, without loss of the continuous contacts. See, also, Patent 2,386,896, Fig. XVI.

Useful in reduction gearing this idea was patented in patents, Nos. 2,091,317 and 2,209,202 to M. F. Hill. The disclosure in these patents was limited to multiples of teeth having a difference of one. The contour and pressure angles of the reissue patent, 21,316 characterized the teeth. Furthermore, in multiplying the teeth, a part of the tooth height was sacrificed; and whatever was done to them thereafter, such as reducing the numbers of teeth again while increasing the eccentricity, the lost height still prevailed. The height of a tooth affects the size and durability of the teeth. Incidentally the centers of the curves of two sides of each tooth were doubled in number, and were evenly indexed with each other. In our Patent No. 2,386,896 the off sides of the adjoining teeth of the outer gear had to have a common center, which affects the relation between the near sides of alternate pinion teeth. Our present gears have no such limitation. The multipled gears had the contours near the convex tops or crowns that the original rotors had. When teeth are multipled, even tho they had a hunting relation between them, the hunting relation between all the teeth is lost.

Gears having a difference of two teeth, resulting from multiplying smaller ratios of integers differing by one, do not have the hunting relation so essential to easy manufacture and good service. To index two sets of teeth with relation to each other in a machine cutting them, with the exactness needed for efficient tight relations, if not impossible, is at least a great expense, and in production in quantity difficult to maintain. In generation, one set of teeth is first generated on a blank; the blank must then be indexed exactly half way, and the second set generated. Error results in hammering of teeth, noise, lost efficiency and wear. The usual manufacturing tolerance would ruin gears for efficient service.

With full hunting relation there is no second indexing, and exact indexing of all the teeth at one setting is accomplished. The hunting relation enables each tooth to engage in proper turn all the teeth of the other rotor. This evens up wear due to differences in hardness or durability of teeth, or grit; and maintains a smooth operating mechanism.

Realizing this, another tooth added to each rotor, changed the ratio circles accordingly. It was a departure from simple multiplying, and eliminated the difficult second indexing. Removing a tooth has the same effect: 8 X 10 gears might be altered to 7 X 9 or 9 X 11, for example.

Then came another conception, the Hill Theorem, a more scientific method of designing gear contours for continuous contact, particularly useful for gears having differences in numbers of teeth greater than one. A difference of two increased the height of a gear tooth, and added displacement It made possible a better location or inclination of the sides of gear teeth to get better pressure angles. It made possible the location of driving surfaces across the ratio circles instead of mostly outside of them to reduce angular slip. It made possible the more intelligent laying out of gear teeth, selecting the best radii of curvature, and determining the Circroidal Addition more accurately than in the generator machine, which had been the best means for designing rotor contours before. Mathematical calculations are intricate and take much time. But in a graph, comparison of different curves is easy. It is the final step in adapting this new type of gears to commercial use.

In new geometrical relations rules or laws are sought to guide those to become skilled in the art. The first rule that appeared important, was that in gears, one within the other, there must be a difference of one tooth only, since a tooth of one had to travel continuously over all the teeth of the other and the speed ratio had to be the ratio of the teeth. This was accepted for years by those developing and commercializing this art. The initial patents, to M. F. Hill contained claims limited to the difference of one tooth.

When it was discovered that the teeth of a ratio differing by one could be doubled, to make a difference of two, or trebled to make a difference of three, the rule had to be modified, and extended to include the multiples.

Thus it was discovered that it was not the ratios of teeth that were controlling but the basic ratios themselves which had to have a difference of one, even if ratios of fractional numbers were necessary.

Then it appeared that doubling a ratio differing by one lost the hunting relation between all the teeth. The even numbers of such a ratio had to be made uneven, possible only for teeth based on a fractional ratio, having a difference of one, the actual number of teeth being found by multiplying the ratio numbers by the denominators of their fractions.

The lowest such ratio having a good driving relation between the gears may be 2½ to 3½, the gears having 5 X 7 teeth. They are not multiples of any ratio having lesser numbers of teeth, and have larger teeth than other ratios of higher numbers.

A 1½ to 2½ ratio, with 3 X 5 teeth is possible for low pressures, tho the drive action is poor. A ½ to 1½ ratio, having 1 X 3 teeth requires additional driving members or gears to keep them registered. Multiples of very low ratios, 1 to 2 or 2 to 3, doubled or trebled, on a shaft, may fit some needs; all having the continuous tooth engagements.

With the "pinion drive", so called as in Gerotors, a pinion is freely mounted on a drive shaft and key, to find its own best running position while driving the outer gear. With 5 X 7 gears the tooth spaces are so deep radially that they almost reach a shaft, of a size needed for heavy torque load. Such teeth are integral with the shaft. But a 3½ to 4½ ratio leaves room for an adequate separately made shaft for high tooth load.

A difference in numbers of teeth of a tooth ratio is not a matter of degree for another reason. In rotors of the same size, a difference of two teeth increases tooth height while a difference of three reduces it, because of the longer crescent space and fewer teeth at work together.

Enough back lash to prevent the teeth on both sides of one gear from riding on the teeth of the other opens crevices between the teeth, unless prevented by the drive. The end of the path of contact occurs when a crevice between contacted teeth starts to open. The location of a tight engagement over a range from one tooth to the next is incident to the ending of the path of continuous engagement.

Paths of continuous engagement vary in different types of continuous engagement gears. There are hosts of types based upon the geometrical principle of the Circroidal Addition. Of the three principal types of gear contours, the Gerotor of the prior art type, having a difference of one tooth, has all the teeth in continuous contact with each other. The outer rotor has a circular curve on each rotor tooth extending over the top and sides with a common center, the tooth centers of all the teeth being evenly indexed. The second type is that shown in the gear Patents Nos. 2,091,317, etc. The outer teeth have the same side arcs of circles, but no complete convex crowns. The arc centers are evenly indexed. The third Rotoid type has teeth differing by two or more with a full "hunting relation," with a center of the arc on one side of each outer rotor tooth unevenly spaced between the centers of the arcs on the other side of the teeth, affording larger radii, better pressure angles and greater size.

The paths of tooth engagements differ in these types. In the first or Gerotor form, the path is continuous around all the teeth, with a loop at full mesh. Without back lash in the second and third type the path starts from the end of a crescent range and stops just short of the full mesh point.

Another path is the reverse on the other side of the gears. The third form, in this case, is complicated further by the odd ratio based on fractional numbers having a difference of one, which has the hunting relation. The location of the tight tooth engagement, or its range from one tooth to the next, is affected by these differences. With back lash between the teeth, the path of contact on the side of teeth not driving, in the second and third types, is removed.

Pressure angles between the teeth in the driving range have an important effect upon the internal resistance of a gear mechanism and the power to drive it. The 30 to 50° angles in the 6 X 7 Gerotors create resistance to rotation by thrusting the outer rotor away from its axis and thrusting the teeth at open mesh against each other. In the gear patents, No. 2,091,317, etc., the tooth contours and pressure angles at full mesh were the same as in Gerotors. Pressure angles between teeth making continuous contacts are not fixed but vary as one tooth rolls against the other across full mesh. Instead of 30° to 50° angles of the 6 X 7 tooth Gerotors, Retoids may have angles nearer 0° to 17°. The radii of curvature may be increased, and the driving curves more steeply inclined. Also, thanks to the Hill Theorem, they now are located wherever desired, inside, across or outside of the ratio circles, always obeying the requirements of the Circroidal Addition.

One of the factors of the low internal resistance is the character of the tooth engagement in the driving range at full mesh. The resistance in Rotoids is reduced to a pure roll of a convex curve on another curve having slightly larger radii of curvature. In 7 X 9 rotors having the same type of contours, the action is even nearer a pure roll.

Continuous contact rotors or gears are now usually manufactured by broaching the outer rotor and generating the pinion. The broach has circular cutting edges to cut the circular arcs on the outer teeth. The bottoms of the tooth spaces do not have to have a generated form as long as they clear the tops of the pinion teeth during rotation.

The pinion is generated by means of a tool, be it a milling cutter or grinding wheel, which has the shape of a tooth of the outer gear, in this case, of the circular arc. The larger this tooth is, the larger the tool and the faster its operation. The relative size shown in Figs. I–III was selected as a means between extreme sizes each of which in that form has a disadvantage, in reducing tooth area.

In mechanisms having continuous tooth engagements, the exact location of tooth contours, or critical portions of them, are so important that wrong locations of them result either in binding, or loss of efficiency. Gerotors, when manufactured are so tight that pressure has been used to put them together. Rotated slowly at first, they lap themselves to a running fit during rotation, and run faster and faster. The power consumed, high at first, steadily drops until when completely lapped to each other, they may be run at high speeds without generating heat.

In Rotoids having the crescent and back lash, the pinion can drop thru the outer gear without touching it. Without the drive that brings the teeth together tight engagement is lacking.

With the same numbers of teeth and the same eccentricity spaces of teeth may vary the path of contact, and the gear tooth size. In Gerotors any contour of either rotor, convex or concave, on a tool, determines by generative processes all the contours of both rotors.

It is the same with Rotoids. However, concave tooth spaces may be deepened as noted.

In the drawings:

Fig. I shows 5 X 7 Rotoids of a selected eccentricity ($\frac{7}{8}$ of an inch) integral with the shaft for high tooth pressures.

Figs. II and III show them mounted on a smaller shaft for low tooth pressures.

Fig. IV is a diagram of the Hill Theorem for epigeneration of 5 X 7 Rotoid tooth contours.

Fig. V illustrates how a 5 X 7 Rotoid curve is arrived at, using the diagram in Fig. IV.

Fig. VI shows a set of 7 X 9 Rotoids of the same eccentricity, and how it allows for a large separate driving shaft for heavy loads, with complete circular tooth crowns on the outer gear.

Fig. VII shows a 7 X 9 set of the same eccentricity with teeth on the outer gear of larger radius.

Figs. VIII and IX illustrate the Hill Theorem for this 7 X 9 ratio.

Figs. X and XI show the method of designing contours of 9 X 11 tooth Rotoids of $\frac{7}{16}$ eccentricity, the increase in size being needed for clearer illustration.

Fig. XII shows, on a larger scale, the Hill Theorem for designing 9 X 11 Rotoids with a hypo system of generation.

Fig. XIII shows 4 X 5 Gerotors of the prior art.

Fig. XIV includes a section on line XIV—XIV of Fig. XV.

Fig. XV includes a section of Fig. XIV on line XV—XV.

Different gear teeth contours have correspondingly different paths of tooth engagements. The contour of a pinion is determined by generating it, using as a generating tool a cutter or grinding wheel having the form and size of a tooth of the outer gear member, this tool being caused to cut or otherwise shape the teeth of the pinion, while the pinion blank rotates on its own axis, while that axis is rotating around the axis of the outer gear, of which the tooth I is a part. Then the tool cuts or grinds the tooth contours of the pinion teeth, starting into a first tooth space grinding or cutting one side as it enters, and the other side as it leaves, then passing to the third tooth space (skipping the second), forming that tooth space, then, skipping the fourth and passing to the fifth; then skipping the first, passing to the second and so on to the fourth when the gear is completed. This unusual generating process results from unusual tooth ratios and their ratio circles. The 5 X 7 tooth gears have a ratio which differs by one, a necessity for continuous contact gear teeth contours.

The ratio is not between integers but between fractional numbers, in this case, $2\frac{1}{2}$ and $3\frac{1}{2}$. But since gears can't run with a half tooth, these numbers are multiplied by the denominator of the fraction, that is by 2, providing the numbers of teeth of 5 X 7. If the fractional ratio was $2\frac{1}{4}$ to $3\frac{1}{4}$, the tooth numbers would be 9 X 13, the ratio numbers multiplied by the denominator 4. These fractional ratios have what is called a "hunting" relation by which each tooth of one gear in some order, makes engagement; a traveling engagement, with every tooth of the other gear. That makes it possible for a tool representing one tooth of one gear to cut every tooth of the other gear. When the tooth forms of one gear are selected or formed arbitrarily, the bottoms of the tooth spaces may be of minor importance, particularly on the outer gear, and as long as the bottoms keep out of contact with the tops of the teeth of the other gear, particularly the pinion teeth, the depth or form of the space is unimportant, so far as continuous engagement is concerned. Reference is made to the reissue patent to Myron F. Hill, No. 21,316 for further description of the generating process and to the patent to Hugo Bilgram and M. F. Hill, No. 1,798,059 describing a suitable generator. For these contours the mill or grinding wheel travels across the gear blank, in a direction parallel to the gear axes; accomplished by mounting the Bilgram-Hill machine upon a shaper, which may carry a grinding head.

Other ratios may be provided, such as $3\frac{1}{2}$ to $4\frac{1}{2}$; $4\frac{1}{2}$ to $5\frac{1}{2}$; etc.; or $3\frac{1}{4}$ to $4\frac{1}{4}$; or any other fractional ratio differing by one. Only these fractional ratios have the desired hunting relation.

The convex portions of the teeth of the outer gear are circular arcs. They need not be circular arcs since other contours may be used. Any portion of an ellipse, cycloid, parabola, hyperbola, irregular oval or mongrel shape, may be used instead of circular arcs. Whatever form is used, they impress, during generation, their characteristics upon the contours of the other gear, and upon the tooth spaces between them where desired. Circular arcs, however, are easier to make and to understand. If on the pinion teeth, they may impress their mating characteristics upon all the contours of the outer gear and where desired upon the tooth spaces on the pinion. Generation may be assisted by our Hill Theorem, so called, now taught in some leading scientific schools. It is illustrated in different applications, in Figs. IV, V, VIII, IX, X, XI, XII and XVI.

In Fig. I, the pinion 1 has five teeth around the axis Y, the side contours of the teeth meeting at the tips at an angle. The outer gear 2 has seven teeth, each including circular arcs, 5 and 6 meeting a point 7. The distances between any one axis 3 or 4 may or may not be equidistant from its two neighboring axes. It depends on their radii of tooth contours. Increasing the radii brings the curve axes of one tooth nearer, and decreasing them does the reverse.

Whatever may be the size of the outer gear tooth its characteristics are impressed by generation on the pinion. This means that each point of the pinion tooth curve is located by some mating point on the outer gear tooth. While the exact tooth contours are impossible to portray in a drawing, the lines of which alone may be hundredths of an inch wide.

The characteristics of the contours and their method of mating are shown. In Fig. I an outer tooth 8 is meshed in the middle of a pinion tooth space, while in Fig. II a pinion tooth 9 is meshed in the middle of an outer gear tooth space 10, in which its contour is mated to a shape for the concave tooth space. This shape may be an exact mating curve or it may be deeper. Its outer portion is preferably deeper as liquid is more easily expelled. The outer gear tooth spaces may be deepened arbitrarily, as at 9a, Fig. III, with reference to the top of the pinion tooth so long as the latter has its necessary freedom to enter and leave without interference, and its needed continuous engagements are not lost.

The difference of two teeth creates the crescent space 11 at open mesh between the broken lines 12 and 13 which are arcs of circles thru the tips of the teeth of the two gears.

Turning clockwise the teeth without back lash engage at the point 14 and their path of traveling tooth engagements is indicated in the dotted line 15 extending from the left end 14 of the crescent 11 to a loop nearing a point at 16, near a center line thru the axes Y and O and then on to the point 17 which is the right end of the crescent 11.

Some gears are more serviceable without back lash. Others particularly for high tooth loads would be forced into heavy tooth engagements, with teeth at 18 and 19, to the detriment of their tooth surfaces. Such gears are provided with back lash, as in Fig. II, where no contact occurs at 20, 21 and 22, on the right side of the two centers Y and O. To create back lash, one method is to generate one of the gears, the pinion for example, then index it slightly (in either angular direction) and regenerate. This shifts one side of a tooth towards its other side, narrowing the tooth. The same shifting of one side towards the other may be applied to the teeth of the outer gear. One or both may be employed, but one is enough. If the pinion in Fig. I drives clockwise or anti-clockwise, engagements between all the teeth of opening chambers except along the crescent space are not altered. High pressure on the opening side of the centers Y and O cannot thrust the closing teeth against each other. Instead, the thrust is resisted by roller bearings, designed for the purpose.

When the pinion shaft 23, Fig. II, drives the outer gear anti-clockwise the teeth engage at 24, 25, and 26 as they open.

If the outer gear drives the inner rotor clockwise, the drive can only occur from 26 to 24.

The bearings supporting the gears resist the thrust at 24—26 that otherwise would thrust the teeth there against each other.

Fig. XIII shows the different path of contact 27 in Gerotors. With its loop 28 at full mesh it is endless.

In Fig. I the Rotoid path 15 extends from 14 to 16.

In Fig. II the path of contact 29 with anti-clockwise pinion drive ranges from 24 and 25 to 26.

With clockwise drive it would be a similar path in reverse on the right hand side of the centers Y and O.

Fig. III has the same paths (not shown) as Fig. II, with the gears in an intermediate position.

Our invention is applicable as to some of its features to many constant contact ratios. The 5 X 7 ratio is unique in that it has the fewest teeth of the fractional ratios, its displacement requiring for medium fluid pressures, a driving shaft so large that the teeth have to be integral with it. Its pressure capacity and low pressure angles make it superior to both the 4 X 5 and 6 X 7 ratios.

Our earliest efforts in rotors, indicated in Patents 1,682,563-4-5, were based upon the "hypo" system of generation, where a pinion tooth form, preferably circular, was used as the master form by means of which the rotor contours were designed by generation. The shortcomings of such rotors were expensive and necessitated the reversal of the method, so that a master form was the tooth form of the outer rotor, still preferably circular. The main advantage of the circular form is the comparative ease of making tools, since other forms require special and intricate mechanical equipment.

Hill theorem

Fig. IV shows a design as a basis of drawing different circroids and corresponding gear contours for comparison, to estimate their relative values. It comprises an outer ratio circle B or arcs BA of it, a pinion ratio circle A, a "radicroid" R which extends from 0 thru 00 to 000 and a circle of eccentricity E.

A circular form may be pivoted at the tip of the radicroid to generate a pinion contour, but other forms may be used. If a non-circular form is used it is fixed to the radicroid, not pivoted. The pinion circle A is divided into equal numbers of arcs. Ten are convenient for a five tooth pinion, some of which are marked 00, 11, 22, 33, 44, 55, 66, and 77, others not to be used. An extra division between 22 and 33 assists accuracy for reasons to follow. It is marked 25. The eccentric circle E is also divided into ten parts, 0, 1, 2, 3, 4, 5, 6, and 7, etc. The others are not used. The starting position of the radicroid is from the point 0 in E thru the point 00 in A, and on out to the point 000 selected for experiment. The ratio circle of the outer gear is not drawn in full to save unnecessary confusion, and is indicated by the arc B in the starting position. As the ratio circle rolls it assumes successive positions indicated in broken lines BA. As the ratio circle rolls, and assumes these various positions, its point 00 travels to various points 10, 20, 25, 30, 40, 50, 60, and 70, which in reality are points in a cycloid, since a point in one circle rolling on another travels along a cycloid. Meanwhile the center of this ratio circle, point 0 in the circle of eccentricity E, travels around this circle E thru the various points 1, 2, etc. As the radicroid R coincides with and includes the radius of B, and moves with it, its tip, out beyond the ratio circle, traces a curve, which runs thru the points 000, 100, 200, 250, 300, 400, 500, 600, 700 etc., or as many others in between as may be needed for accuracy. This is the circroid wanted for trying out gear curves. Another circroid might be CRA. A circroid is a species of trochoid limited to generating gear curve uses. Point 000 is selected arbitrarily as a starting point. Varying it, varies resultant contours of teeth. As B rolls anti-clockwise on A the point 00 describes a cycloid C. As 00 travels to the left along CR, the radicroid is carried (by the circle B) with it. The pivot of the radicroid 0 also travels around E anti-clockwise. Thus the radicroid R in each successive position has two points to locate it and thus its outer end 000 traces a definite path CR. When B, rolling on A, is tangent at 1, 0 reaches 1 in E; 00 reaches 1 in A; and 000 reaches 100 in CR, etc.

Fig. V transfers from Fig. IV, the pinion ratio circle A, circroid CR, eccentric circle E and radicroid R, for plotting the critical inner limit of the pinion contour. The figure shows this circroid CR and the pinion ratio circle A with its above described dividing points. We seek a contour parallel to or equi-distant from the circroid. The circular arc is to be used to describe this parallel curve, its envelope, from successive points along the circroid. We do not yet know the best length of the radius of M. If it is too long, a critical portion of the envelope MB will be broken into parts crossing at different angles. There must be a critical point inside of which the perfect gear tooth contour must lie. If it is to be parallel to the circroid it must have all its normals—i. e. normals to its tangents—also normal to the envelope, and for an equi-distant envelope all such normals must be of equal length. If the curve MA is a non-circular curve, the envelope corresponds to its irregularity. But in that direction lie complex tooth forms with circroidal additions to correspond.

The radicroid includes the portion 0 to 00 which is the radius of the ratio circle B, cf the outer gear 2 in Figs. I–III. This ratio circle is shown in Fig. IV, tangent to A at its point 00. The angle between CL and 0—00 is 36° which is one half of a tooth division of the gears, in Figs. I–III.

These locations are selected to conform to mathatical formulae for points in a gear curve, in terms of their ordinals and abscissae.

If the circle B, tangent at 00, starts to roll to the left, its point of tangency travels along A thru the successive points A11, A22, A33 etc. The circle B at these locations is illustrated in the broken lines BA. The point 00 in the radicroid i. e. the end of the radius 0—00, travels over a cycloid C thru C10, C20, C30 etc., to points in a curve CR, designated at CR000, CR100, CR200, etc.

The corresponding radicroid positions are sketchily indicated by broken lines from E thru C10, E2, to C20, E3 to C30, etc., to the same points CR000, CR100, CR200, etc. These broken lines therefore extend outward a distance which is known as the "circroidal addition." This distance is arbitrarily chosen. It is a critical factor.

Cycloids have instant radii down to zero in length, hence no other curve inside can be parallel or equidistant from it. But this is not true of the circroid. Where the cycloid has a minimum radius of zero, a circroid has a minimum of 90°. As the radicroid travels, this 90° angle is increased up to a maximum, and permits within it, curves equi-distant or paralled to it. These are the curves of possible gear teeth, and are to be laid out.

In Fig. V there is a critical point between which and Y a tooth contour for continuous contact is impossible. It has to be located.

Instant radii of the circroid are explored to find an intersection nearest to the circroid. These radii obviously originate on the circle A upon which the circle B is tangent, and a line from this tangent point to the tip of the radicroid, in the circroid CR is an instant radius. Instant radii from points CR200 and CR300 to points 22 and 33 of the circle A intersect at N. If another instant radius half way between A22—CR200 and A33—CR300 is plotted, it also intersects N or very close to it. If a gear curve is located on N it has a sharp corner, which is to be avoided for useful gears. A radius M, shorter than A22—CR200 is therefore selected as of a circular generating form M to outline an envelope which is to be a gear curve. Other forms are contemplated of which more anon.

The form MA may be a tool form for cutting a gear blank (with its stroke parallel to the axis Y) or it may be an arc struck by compasses from the point CR000 as a center. This tool form or arc travels along centered at successive points of the circroid CR outlining the envelope M2 useful for a tooth contour. Any part of the envelope lying within 36° may be one side of a tooth. Radial lines from Y thru A00 and A11 are 36° apart, also thru A11 and A22. A curve from 3 on Y—A11 to T on Y—A22 is therefore suitable as one side of a gear tooth. That portion of the arc MA that outlines the contour MA5 to T is employed as a corresponding half of the outer gear tooth, its other side being the same in reverse (usually).

Just as a radius of a circle is normal to it, so circroids have radii normal to them. Such a radius is from a point of the circroid to a corresponding point on the ratio circle A to which the ratio circle B is tangent at the time. The end of the radicroid, while tracing the circroid, is swinging or turning on a travelling point—the point of tangency between the circles A and B. A few of these instant radii are indicated in this Fig. V, one from 200 to 22, and another from 300 to 33. They converge more than any of the other instant radii from other points. Another from 250 to 25 also inclines toward 300 to 33, even more. That point of intersection between these various instant radii nearest to the circroid, is the critical point that we are after, since any envelope beyond it is broken up by the arcs lying at interfering angles. This point of intersection is indicated at N. Any envelope between N and the circroid (radially outside of N) will provide a tooth curve having a continuous tooth contact relation with a tooth curve MA of an outer gear.

The distance of the tip of the radicroid to its ratio circle is termed the "circroidal addition," and with a given ratio, this circroidal addition determines the distance of "N" from it. Circular master forms have been described, but any tooth curve designed for gears having radii of curvature greater than the zero of a cycloid, where it crosses the ratio circle, must observe the requirement of the circroidal addition in order to maintain continuous contacts at steady speed. (The same is true as to such tooth curves, the tops of which are cut off at the ratio circle as in certain gears.)

The nearer the tip of the radicroid is to its ratio circle, the shorter the radius M. By such reductions the instant radii of the circoid are reduced. If this reduction is carried to its limit—zero—the circoid is merged into a cycloid as C, and the radius of MA is correspondingly reduced to 0. To put it another way, there is no envelope possible within a cycloid and equi-distant from it. It is the failure of gear designers generally to observe this fact that is responsible for noisy gears and limited durability.

One would naturally suppose that in order to generate a tooth of a gear, a blank would be located on the inner ratio circle axis, and a tool to generate with located on the outer ratio circle radius and that generation would produce continuous contact tooth curves. When this process failed to produce a smooth acting curve, as it always must, it was a puzzle. The generating tool certainly could not be carried on a greater radius than that of the ratio circle, they argue, because the speed ratio would be changed. That is where efforts to solve this rotary problem undoubtedly bogged down. It is the illogical idea that solved the enigma. For while a master form is mounted on a radicroid of greater length than the radius of a ratio circle, nevertheless the resulting generated tooth contour may lie across the ratio circle as gear teeth should, and thus travel at the speed ratio. It also might lie outside of the ratio circle but that location introduces angular slip and poorer pressure angles. A rotoid tooth may have different arcs on its two sides. If a master form is a composite of different radii of curvature, the point N is to be determined from the several segments which lie nearest to the nearest circroid. Contours once determined may be modified or undercut where not needed for engagements.

In order to locate as accurately as possible, the intersection N in Fig. V a large chart was used, and instruments of accuracy located the various points involved. The relative location shown is approximate. A number of normals were drawn from points on the circoid between 200 and 300 to corresponding points upon the ratio circle A before the location of N was finally accepted. Varying the ratio or circroidal addition shifts it. For the relations shown in Fig. V the intersecting normals or instant radii of the circoid are between the 200 and 300 positions. For other relations it is nearer the point 000 or further away from it. Some of the normals diverge and require no consideration. While the diagram method is a shorter and easier one, differential equations may be used to find the mathematically correct N, by increasing the circroidal addition with the same M radius.

Practically, the tooth curve is drawn as an envelope outlined by arcs having the radius M, centered at successive points all along the circroid. The radius M must locate the envelope between the point N and the circroid. The nearer it is to the circroid, the more it partakes of its degree of curvature. The nearer it is to the point N the sharper the curvature around N. If carried to its limit, a corner of N is arrived at, too sharp for use. By having the curve located a small distance from N as indicated, the best results are attained.

Pressure angles are involved in the radius of the curve M. The less the radius, the greater the variation in the pressure angles in the driving range. Average pressure angles for a given ratio are derived from the largest useful radius of curvature. The inclination of the curve is also better with a larger radius, due to the curve centers being farther away around the ratio circle, as indicated in Fig. IV where 000 is to the right of the vertical axis, while the tooth curve MB is to the left. The pressure angle is equal to that between a tangent to the driving curve at any point, and a radius of a ratio circle to that point. During a driving relation over a driving range of one tooth division, the tangent point is traveling, hence its angle varies. A fixed pressure angle bars continuous tooth contact in the driving range.

As the circroidal addition is reduced as described, the critical normal from the circroid to the ratio circle is ever shifting along the circroid towards 000. With changes in the numbers of teeth, and with variations of the other factors mentioned, the location of the normal also changes in one direction or another, and in designing different gears, with different relative radii of curvature, these various changes are studied to select the forms most suitable for the gears desired, compromising upon numbers of teeth, size of master curves, circroidal additions, for strength, low pressure angles, and size. By making graphs of the effect of the changes of each of the factors, one is enabled to select more intelligently the form best suited to the problem in hand.

In order to design 9 and 11 tooth gears the ratio circle A2 of Fig. X has a radius 4½ times the eccentricity, and the ratio circle B2 has a radius of 5½ times the eccentricity. Circle A2 has a number of divisions laid off on it of equal length and the points of the cycloid C2 are located to accord with them. The rest of the procedure is similar to that for the 5 and 7 tooth gears, except that the radius M2 and the circroidal addition have to be experimented with to get the best form of tooth curve, the best pressure angles, and sufficient tooth size for the different ratio. Such experimentation consists of varying the circroidal addition by varying the extension of the radicroid beyond its ratio circle, then finding the point W2 for such circroid as may be described by the radicroid, and then with a radius M2 a little short of the point N2, outlining a gear tooth curve.

After describing a curve that appears satisfactory for the tooth ratio, its driving relation, its pressure angles, etc., the next step is to select the portion of such a tooth curve desired for a gear tooth. In Fig. XI curves were sought for a five tooth pinion. The curve T2 may be one side of a tooth. Obviously half a tooth is limited to one fifth of 360° divided by 2, which is 36°. So next it is desired to find out what part of the curve T may be utilized for one half of the tooth. The broken lines G2Y2 and H2Y2 are drawn from the ratio circle center Y2 at such an angle of 36°. By swinging them around the center, back and forth, they include different portions of the curve T2. The part included in this figure is from G2 to H2. If swung to the right, the end H2 is nearer the center Y2 and there is little change of diameter at G2. This might be desirable as it increases tooth area, but for many uses the shaft usable with this contour would be too small.

Also the teeth might lack strength as being too thin. The teeth shown in Figs. I–III show the final compromise between these factors. They would have to be integral with the shaft for purposes of strength, a unique case. Smaller ratios usually need outside gears to keep them in registration. The next larger ratio having the desirable hunting relation is the 7 to 9 ratio in Figs. VI-VII. The next, the 9 to 11 ratio, is the one in Fig. XV. They cover the ground of the Gerotors now in use having ratios of 4 and 5, 6 and 7, 8 and 9, and 10 and 11. The 5 to 7 tooth ratio supplants both the popular 4 and 5 tooth, and the 6 and 7 tooth ratios now in use; with better pressure angles, and with greater pressure capacity.

The 8 X 9 rotors reduce friction and increase pressure capacities. There is one other variation, by means of the hypo type of the Hill Theorem in Fig. XVII. It comprises first an outer ratio circle A3, and arcs B3 of a rolling inner ratio circle. The eccentric circle E3, centered at Y3 (also the center of A3) is divided into eleven equal tooth division parts by points A30, A31, A32, etc., each extending one eleventh of 360°. Some divisions are subdivided as noted later. The rolling circle B3 has nine such divisions for 9 to 11 teeth.

As B3 rolls from its starting point at A30, the point 00 in B3 describes a hypocycloid C3, the rolling circle being always tangent to A3 passing points 1, 2, 3, etc. and intermediate points in A3. A center of B3, at 0 in the eccentric circle E3 (E30) meanwhile swings around Y3 thru points C31, C32, etc. When the rolling circle is tangent at 1 in A3 (A31) its center at 0 has reached the position E31. A line from one to the other is an instant radius. When the rolling circle is tangent at 2 in A3 (A32) its center reaches E32 and so on. The positions of 00 when 0 in E reaches E31, E32, E33, etc. are marked 1, 2, 3, etc. in the cycloid C3 and referred to as C31, C32, C33, etc.

The circoidal addition in Figs. IV, V, VIII, IX, X, and XI becomes a "circoidal subtraction" in Fig. XVIII, and the hypo circoid CR3 runs thru its points 0, 1, 2, 3, etc. They are referred to as CR31, CR32, CR33, etc. Lines are drawn from points A31, A32, A33, etc. thru points CR31, CR32, CR33, etc. respectively and extended to find their points of intersection. The intersection N3 nearest to the circoid is a critical point. Other lines intermediate may be drawn to check up on N to be sure there is no nearer intersection.

With a radius M3 shorter than the distance from N3 to the circoid CR3, arcs are struck from points CR31, CR32, CR33 and other points along the curve passing thru CR31, CR32, etc. which is the contour MB3 of a gear sought.

Backlash is indicated by the broken line 31, Fig. VII which is the tooth contour before backlash is created. The contour 32 shows the contour with the back lash. The difference in practice is seldom as great as the drawing indicates. Usually it is a few thousandths of an inch.

If the outer gear tooth contours in this figure are generated by or from the contour of the pinion teeth 33, the outer teeth end in points as in broken lines at 34. With such teeth, the pinion tooth spaces have to be deepened as at 35 by generating them with a tool having the contour 34 of the outer teeth.

When the outer teeth are circular there is therefore a loss of length of path of contact. They provide a crescent area between 36 and 37, while the pointed outer teeth and pinion tooth spaces provide for a crescent of lesser area between 36 and 38. But tools cost a trifle more.

The same is true of the gears in Fig. VI. But in Fig. VI the average distance from the axis of the gear spaces in Fig. VI is greater due to narrower outer teeth and wider tooth spaces.

Fig. IX indicates the difference in design of the two gear systems. The curve 39 in Fig. IX is the curve 29 in Fig. VII, while the curve 40 in Fig. IX is the curve 40 in Fig. VI. They both are envelopes described in Fig. IX from the same circoid CR1 with circular curves of different radii. They both lie on the safe side of the critical intersection N1.

The circoid CR1 was constructed in Fig. VIII, with the ratio circles A1, B1, the eccentric circle E1, the rolling arcs B1, the cycloid C1, and radicroid R1 as in Figs. IV and V. These gears it may be noted have 7 X 9 teeth, a ratio of 3½ to 4½. Those in Fig. XV have 9 X 11 teeth, a ratio of 4½ to 5½, the curves designed as in Figs. X and XI. In this case the pinion ratio circle A2 has 18 divisions, nine of which are noted for use. The eccentric circle E has of course the same number. The cycloid C2 has corresponding points. The radicroid runs from E20 thru Y2, A200 to CR20 and swings around, its center passing thru E21, E22, E23, etc., its point O in CA2 traveling along the cycloid, and its tip describing the circoid CR21, CR22, etc. This circoid is repeated in Fig. XI, accompanied by the factors in Fig. X needed for arriving at a gear tooth contour.

A circular form M2 centered at CR20 travels along the circoid CR2 outlining a tooth curve in the sector between Y—C2—0 and Y—A2—1. By swinging this sector to the left around Y2 it encloses a better tooth form between the protractor arms G2 and H2 which is that adopted. The broken line curve T21 could be used instead of T2 or others described to the right of N2, the point of critical intersection. The curve T2 is the tooth contour of the pinion in Fig. XV. The outer teeth have the circular curve M2 or the whole outer gear contour may be generated from this form of pinion tooth.

Pressure angles are noted in Fig. X at 5°, 14° and 20°. When a gear tooth is centered at CR20 it is on line 5°. But its drive is nil as indicated at M2 in Fig. XI. When it reaches the point 1 on CR2, not shown because of resulting confusion of lines and characters, it is close to 5° where it begins to drive. It has the best driving relation over the next tooth division indicated on A2 from A21 to A23 which is one eleventh of 360°, to the angle line near 20°. It still has a fair angle over the next tooth division assisted by another tooth drive along the previous tooth division. The drive over the first tooth division has very slight slip or slide, being mostly of a rolling character, hence it controls wear. As the slip increases on later tooth divisions, wear takes place until there is not enough mechanical pressure between teeth to cause wear.

Angles of tooth pressure vary with the design. The less the circoidal addition the better the pressure angles, but the driving teeth are smaller. This relation continues until the teeth become mere points, and are useless.

For a high speed displacement device and lowest degree of friction, an anti-friction bearing is needed. Such bearings heretofore have had to be oiled. The bearing shown can run at high speeds without oil. A 1¾″ shaft bearing built according to the patent to M. F. Hill, 748,002, ran on test at 40,000 R. P. M. for an indefinite period, getting about as warm as one's hand. At 45,000 it would stop on account of swelling from heat. Or a drop of oil squirted into it would slow it right down. The main rollers 42 are separated by separating rollers 43, the ends 44 of which project beyond the main rollers and are enlarged to prevent their slipping in between the main rollers. The axes of separating rollers lie in the planes of their nearest main roller axes. Rings 45 outside of the ends 44 prevent radial displacement outwards while they are of a size to just clear the shaft 46, to prevent inward radial displacement. All running parts may be hardened. This is a journal bearing to run between side walls. The outer gear is driven by a gear 47 meshed with teeth 48 on the outer gear.

Radial lines drawn from Y3 to A30 and A310 have an angle between them of one eleventh of 360°, a whole tooth division of the outer gear. One half of this angle, as a protractor, centered at Y3 can define the limits of a tooth curve, convex and concave for one side of a tooth and tooth space, after which a pinion tooth has for its two sides this contour and its reverse. Such a tooth contour on a tool may be used to generate the entire pinion contour to mate with the outer gear tooth contour. These methods may also be used with the epi ratios.

There is no limit theoretically to the highest numbers of teeth, hypo or epi, possible with our ratios having a difference of two or more teeth. The least number of teeth is determined by the manner of driving relation that keeps them running at the steady ratio speeds necessary for continuous tight engagements. A 5 to 7 tooth ratio provides an excellent driving relation between the teeth, better than with teeth having commercial forms now generally used. A 3 to 5 tooth ratio has a long driving contact across full mesh of a rolling character. However it has to be assisted in part of the driving range by a very considerable radial rubbing action between the teeth. A second gear on the same shaft, alternated, has the effect of 6 to 10 teeth. Outside gearing may be used to keep them in some degree of registration. Other low ratios, alternated and doubled, trebled or multiplied may fit various needs. All these modifications lie within the scope of our invention.

The importance of continuous engagement at steady ratio speed is perhaps realized in connection with such low ratio gears, where continuous contact means one contact, not two or three, and its continuity means nothing if tooth curves are irregular, since the teeth might have unsteady speeds and still maintain continuous contacts. Only correct ratio contours based on the circroidal addition make possible their steady ratio speeds.

Portions of other master generating contours such as cycloids, ellipses, oval curves or portions of them or a series of one or more of them, and mated contours of them may be substituted for circular arcs with a circroidal addition, hence, made operable in the light of our invention.

What we claim is:

1. In a rotary gear mechanism, toothed members, one outside of, eccentric to, and having more teeth than the other the numbers of said teeth being based on a fractional ratio having a difference of one; means to drive one toothed member with relation to the other; one toothed member having inwardly projecting teeth separated by tooth spaces and the other having outwardly projecting teeth, said teeth on said toothed members intermeshing with each other as they enter and leave each other's tooth spaces, and having contours providing a traveling relation between the teeth and tooth spaces at steady ratio speeds; providing for drive contacts at full mesh; providing for a crescent range between the teeth at open mesh and providing for tooth engagements between full mesh and said crescent range to reinforce the said drive relations; said engagements maintained tight by said driving means; said tooth contours being based on ratio circles or curves proportional to the numbers of teeth; and the contours of teeth on one of said toothed members having centers of curvature located to travel outside of said ratio circles at distances sufficient to maintain said engagements.

2. The combination claimed in claim 1 having the contours on one side of said teeth shifted angularly providing back lash between and in cooperation with said crescent range eliminating riding action of the teeth of one toothed member on the teeth of the other toothed member not participating in said drive relation.

3. The combination claimed in claim 1 having a shaft for driving a toothed member; having numbers of teeth the products of a tooth ratio of 2½ to 3½ multiplied by two; and having the teeth of the inner toothed member integral with said shaft.

4. The combination claimed in claim 1 including toothed members whose numbers of teeth differ by more than two.

5. Rotary toothed gear members, one outside of, eccentric to, and having a greater number of teeth than the other, the numbers of said teeth corresponding to a basic tooth ratio of fractional numbers differing by one; means to drive one gear member with relation to the other; one member having inwardly projecting teeth and the other having outwardly projecting teeth, said teeth intermeshing with each other and having contours providing a traveling relation between the teeth at ratio speeds; providing driving contacts at full mesh; providing a crescent range between the teeth at open mesh where no driving action occurs; and providing continuous tooth engagements at steady ratio speeds between full mesh and open mesh for reinforcing each other; said teeth being based on ratio circles or curves conforming to their numbers of teeth with the centers of curvature of said driving tooth contacts traveling far enough away from said ratio curves to maintain said contacts and engagements at said ratio speeds, and said teeth forming tooth spaces between them and between said contacts and engagements.

6. The combination claimed in claim 5 having the numbers of said teeth the products of said basic fractional numbers multiplied by the denominator of said fractions.

7. The combination claimed in claim 5 having convex driving curves on the teeth of one gear member, and concave tooth spaces on the teeth of the other gear member rolling on the convex curves of the first member across the driving range at full mesh.

8. The combination claimed in claim 5 having the contours of the teeth of one of said gear members comprising circular arcs.

9. The combination claimed in claim 5 having the driving contours of the outer gear member comprising circular arcs.

10. In a reversible rotary gear member, toothed gear members, one within, eccentric to, and having two teeth less than the other; means to drive one member with relation to the other; the teeth of one member projecting inwardly and the teeth of the other member projecting outwardly, said teeth on said gear members intermeshing with each other; and having contours providing a driving relation at steady ratio speeds, providing driving contacts at full mesh; providing a crescent range between the teeth at open mesh where no driving contacts occur; and providing tooth engagements between full mesh and said crescent range for reinforcement of each other; said contacts and engagements maintained tight by said driving means.

11. The combination claimed in claim 10 having the numbers of said teeth of said gear members proportioned to a ratio based upon fractional numbers having a difference of one, the actual numbers of teeth being the products of multiplying each of the fractional numbers by its denominator.

12. The combination claimed in claim 1 having the teeth of the inner gear member provided with curved side contours characterized by an angle at their outer tips.

13. The combination claimed in claim 5 having for its numbers of teeth 3½ to 4½ multiplied by more than one.

14. The combination claimed in claim 5 having for its numbers of teeth 4½ to 5½ multiplied by more than one.

15. The combination in claim 10, having for its numbers of teeth a basic fractional ratio differing by one multiplied by the denominator of said fractional ratio.

MYRON FRANCIS HILL.
FRANCIS A. HILL 2ND.

References Cited in the file of this patent

UNITED STATES PATENTS

| Number | Name | Date |
|---|---|---|
| 2,091,317 | Hill | Aug. 31, 1937 |
| 2,209,201 | Hill | July 23, 1940 |
| 2,484,789 | Hill et al. | Oct. 11, 1949 |